United States Patent [19]
Bomans et al.

[11] Patent Number: 6,094,608
[45] Date of Patent: Jul. 25, 2000

[54] PROCESS AND DEVICE FOR AIDING AERIAL NAVIGATION, FACILITATING THE INPUT AND CONTROL OF FLIGHT DATA

[75] Inventors: Muriel Bomans, Antony; Sylvie Grand-Perret, Marcoussis, both of France

[73] Assignee: Sextant Avionique, Velizy Villacoublay, France

[21] Appl. No.: 09/101,445

[22] PCT Filed: Jan. 14, 1997

[86] PCT No.: PCT/FR97/00059

§ 371 Date: Jul. 16, 1998

§ 102(e) Date: Jul. 16, 1998

[87] PCT Pub. No.: WO97/26637

PCT Pub. Date: Jul. 24, 1997

[30] Foreign Application Priority Data

Jan. 19, 1996 [FR] France .................................. 96 00604

[51] Int. Cl.[7] ...................................................... G08G 5/00
[52] U.S. Cl. ............................................. 701/14; 701/200
[58] Field of Search .................................. 701/3, 14, 200; 73/178 R; 244/175; 345/352, 353, 354

[56] References Cited

U.S. PATENT DOCUMENTS

| | | | |
|---|---|---|---|
| 4,970,683 | 11/1990 | Harshaw et al. ........................ | 345/353 |
| 5,444,837 | 8/1995 | Bomans et al. ......................... | 395/140 |
| 5,454,074 | 9/1995 | Hartel et al. ............................ | 345/326 |
| 5,475,594 | 12/1995 | Oder et al. ............................... | 701/14 |
| 5,522,026 | 5/1996 | Records et al. ......................... | 395/326 |

OTHER PUBLICATIONS

Ditter, Al; "An Epic in the Making"; Commuter World; Dec. 96–Jan. 97; pp. 16–21.

*Primary Examiner*—Michael J. Zanelli
*Attorney, Agent, or Firm*—Oblon, Spivak, McClelland, Maier & Neustadt, P.C.

[57] ABSTRACT

To facilitate the task of a pilot, an on-board computer (FMS) carries out a dialogue with the pilot via a data display and input console (MCDU). This console displays a list of tasks to be executed in the form of a succession of selectable and activatable main zones (40). Each zone corresponds to a task, executed via the console, and when the task has been executed (validation key actuated by the pilot), the list of tasks is redisplayed with a specific mark in an auxiliary zone (50) corresponding to the task executed. The auxiliary zone is located next to the main zone in which the task to be performed appears. The copilot, if there is one, receives the same mark. If it is he who executes the procedure, the mark appears in another auxiliary zone (60) lying on the other side of the main zone. At any instant of the procedure, the pilot and the copilot both see at a glance which tasks have been executed, who has executed each, and which tasks remain to be performed.

9 Claims, 7 Drawing Sheets

PROCESS AND DEVICE FOR AIDING AERIAL NAVIGATION, FACILITATING THE INPUT AND CONTROL OF FLIGHT DATA

BACKGROUND OF THE INVENTION

1. Field of the Invention

The invention relates to processes and devices for assisting aerial navigation.

2. Discussion of the Background

In general, it is known that in aerodynes (aircraft, helicopters, etc.) of modern design, the pilot must carry out a dialogue with a flight management system, this being a computer on board the aerodyne (we shall subsequently speak of an aircraft) for assisting the pilot in a number of operations. These operations are mainly operations for defining the flight plan before take-off, piloting (manual or automatic) operations during take-off and landing, aerial navigation operations (path calculations, etc.), systematic monitoring operations while cruising or when approaching an airport.

The flight management system operates on the basis of data entered by the pilot, data supplied by sensors distributed throughout the aircraft, and possibly digital data transmitted by radio from the ground or from other aircraft or even satellites ("DATALINK" system which is undergoing generalization). The dialogue between the flying crew and the flight management system is carried out mainly by means of at least three interfaces, viz.:

- a navigation display on which is represented the plot of the desired course of the aircraft, that is to say a graphical representation of the flight plan of the aircraft and the situation of the aircraft within this plan;
- a primary flight display which depicts an artificial horizon which tilts as the aircraft tilts, an indication of the longitudinal attitude of the aircraft, and other useful flying indications, in particular the mode of guidance of the aircraft;
- a flight control unit having manual controls for selecting settings such as the desired heading of the aircraft;
- and finally a keyboard/display console, termed the MCDU ("Multipurpose Control Display Unit"), this being a data display and input console allowing the flying crew to enter data into the flight management system and to read information forwarded by the flight management system on the basis of the data entered.

The data display and input console possesses firstly a screen, secondly function keys and finally an alphanumeric keyboard.

As is known, the operations to be performed by the flying crew (one pilot or two pilots) during the various phases of the flight are numerous; they have to be executed systematically, in such a way that the flight management system has access to all the necessary flight scheduling and monitoring data.

In particular, a series of monitoring and data input operations have to be performed by the flying crew during the preflight phase and before the approach phase. Still other operations have to be performed en-route.

The pilot who performs the operations must take care that all the operations provided for within the procedure have been executed properly. Furthermore, in the case of dual controls, these operations have to be shared with the assistant pilot and the operations performed by one of the pilots have to be verified by the other. The communication between the two pilots is verbal, the cockpit comprising two identical sets of flying controls located side by side, each set containing identical interfaces with the single flight management system (or twin system together with a synchronization mechanism).

SUMMARY OF THE INVENTION

An objective of the invention is to propose a process and a device for aiding aerial navigation which make it easier for the pilot to execute the tasks incumbent upon him in connection with the flight management system during the various phases of a flight.

The process uses the flight management system and its data display and input console; the console is of a type which makes it possible in particular to select predetermined zones of the display in order to trigger the execution of operations corresponding to the selected zone. The process consists in:

- simultaneously displaying on the screen of the console a series of main zones which follow one another from the top to the bottom of the screen, each zone corresponding to a step of a navigation procedure, and an independent auxiliary zone associated with each main zone and lying immediately next to this main zone,
- in the event that a user selects a main zone corresponding to a specified procedural step, displaying on the console elements necessary for executing this step,
- in the event that an item for validating the procedural step corresponding to the selected main zone is input into the console, once again displaying the series of main zones and the associated auxiliary zones, and simultaneously displaying in the auxiliary zone associated with the selected main zone a specific mark indicating that the procedural step has been validated,
- retaining in memory and redisplaying, after executing other procedural steps corresponding to other main zones, the previously displayed specific marks, in such a way as to make the validated execution of all the procedural steps already performed appear comprehensively on the screen of the console.

Furthermore, in the event that two sets of flying controls are provided, with two data display and input consoles communicating with the same flight management system, there is preferably provision for a first and a second auxiliary zone to be associated with each of the main zones, and there is also provision for:

- the inputting of a validation item via the first console during the execution of a procedural step corresponding to a specified main zone causes the displaying of a specific mark in the first auxiliary zone associated with this main zone, both on the first console and on the second,
- and conversely the inputting of a validation item via the second console causes the displaying of a specific mark in the second auxiliary zone, both on the second console and on the first.

The display of the specific marks is redisplayed each time on the two consoles after executing each procedural step, in such a way as to make the validated execution of all the procedural steps already performed appear comprehensively on the two consoles, the originator of the validation being indicated by that of the two auxiliary zones which is ticked by a specific mark.

The invention relates not only to the process which has just been summarized, but also to a device for aiding aerial navigation.

The device according to the invention uses a flight management system which carries out a dialogue with the pilot by means of several interfaces which include at least one data display and input console, and it is characterized in that it comprises means for simultaneously displaying on the console a series of successive main zones each corresponding to a step of a navigation procedure, and an independent auxiliary zone associated with each main zone and lying immediately next to this main zone, user-actuatable means for selecting a specified main zone, means for exhibiting on the console, when a main zone is selected, a display necessary for executing the procedural step corresponding to this main zone, means for inputting into the console an item for validating the procedural step and for then once again displaying the series of main zones and the associated auxiliary zones, means for displaying in the auxiliary zone associated with the selected main zone a specific mark indicating that the procedural step has been validated, and means for retaining in memory and redisplaying, after executing other procedural steps corresponding to other main zones, the previously displayed specific marks, in such a way as to make the validated execution of all the procedural steps already performed appear comprehensively on the console.

Furthermore, if the flight management system comprises a second console identical to the first, provision is made for a first and a second auxiliary zone to be associated with each of the main zones, means being provided such that a validation item input via the first console during the execution of a procedural step corresponding to a specified main zone causes the displaying of a specific mark in the first auxiliary zone associated with this main zone, both on the first console and on the second console, and conversely that a validation item input via the second console causes the displaying of a specific mark in the second auxiliary zone, both on the first console and on the second console.

Among the advantages of the invention may be mentioned in particular the fact that the system is proof against interruptions: the pilots are frequently interrupted in their check sequences, most especially in the preflight phase. With the invention, they have available a summary of the steps already performed and they can return rapidly to their sequence of checks; they need not run through successions of pages of tasks in order to recollect the steps already performed.

Moreover, the process will support the new "DATALINK" mode of dialogue in which information is transmitted between the ground and the panel by radio: it will be possible for information sent by the ground to the flight management system to appear in the steps of the procedure, in a particular form which attracts the attention of the pilot. The pilot will verify and accept this information in the same way as if he had entered it himself.

BRIEF DESCRIPTION OF THE DRAWINGS

Other characteristics and advantages of the invention will emerge on reading the detailed description which follows and which is given with reference to the appended drawings in which.

DESCRIPTION OF THE PREFERRED EMBODIMENTS

FIGS. 2 to 6 comprise indications written such as they may appear in reality in an airliner, hence in the form of words or abbreviations.

Figure 1:
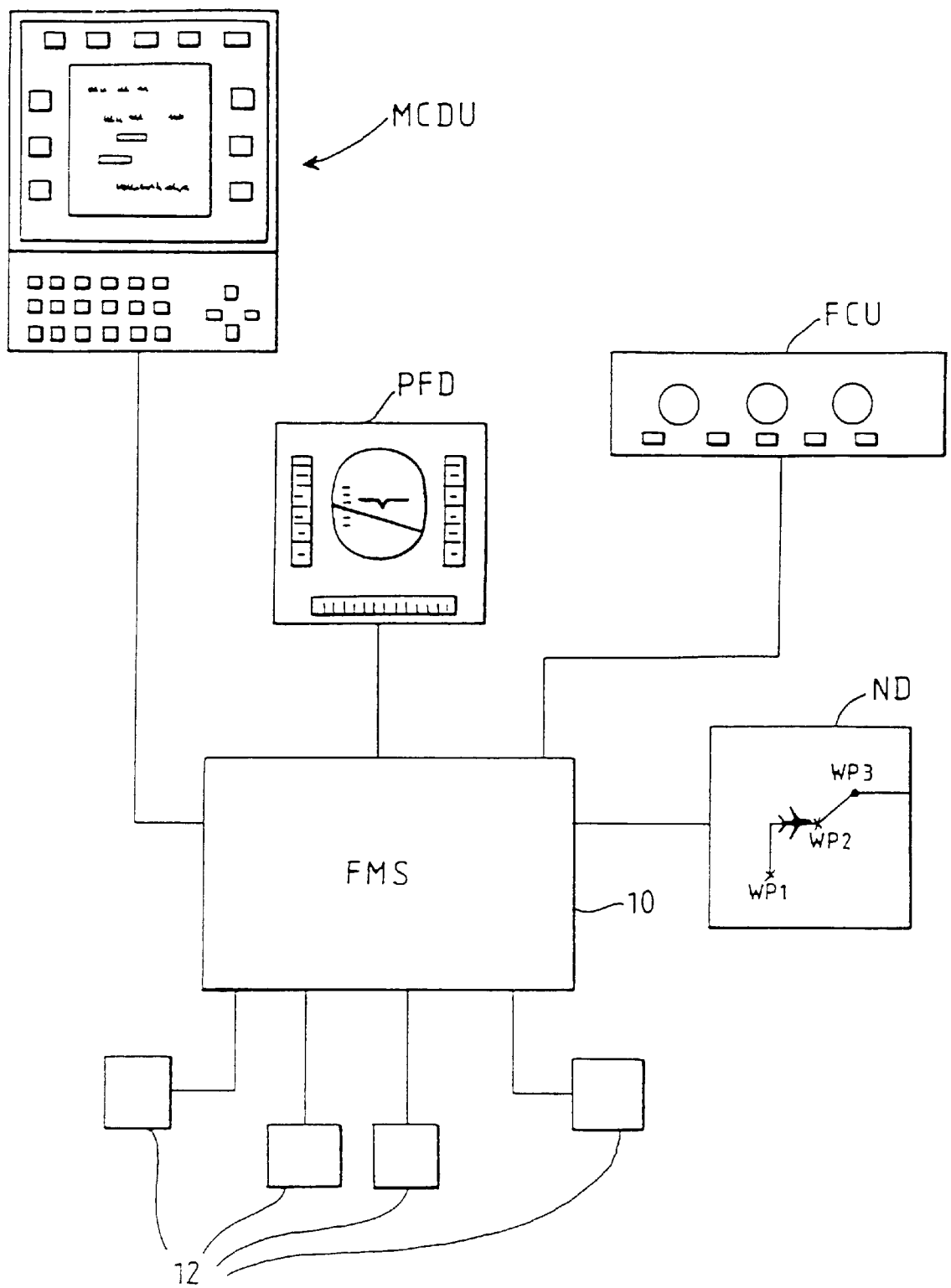
FIG. 1 represents the complete device for aiding navigation according to the invention.

The device for aiding navigation according to the invention constitutes a part of an overall aircraft monitoring system. As shown in FIG. 1, this overall system essentially comprises:

the flight management system or FMS, 10 is a computer which can receive various information, can calculate other information and can forward it to the pilot by means of dialogue interfaces;

sensors 12 distributed throughout the aircraft, including for example navigation instruments (IRS inertial units, etc.), various sensors giving information about the state of the aircraft, optionally instruments for communicating with the outside, all of these sensors being linked to the flight management system;

the interfaces for carrying out a dialogue with the pilot, which are linked to the computer 10, and which will mainly include:

a flight control unit or FCU which makes it possible, with the aid of buttons, to select for example the heading of the aircraft, or other settings which have to be supplied to the management system;

a screen for displaying navigation information, ND ("Navigation Display"), for displaying maps, flight plans etc., a primary flight display PFD for displaying an artificial horizon, altitudes of the aircraft, attitudes, velocity vectors, an indication of guidance mode ("Flight Mode Annunciator"), etc., a data display and input console or MCDU ("Multipurpose Control Display Unit"); this console is the instrument of main dialogue as regards the present invention, and it operates under the direct control of software contained in the FMS computer. Naturally, the console itself may contain suitable software necessary for its operation, in the general case where this console comprises a microprocessor and circuits controlled by this microprocessor. For example, the routines for displaying plots on the screen, the routines for managing the data entry keyboard, etc. are suitable for the console and the corresponding software can be built into the console, whereas the information to be displayed generally arises from the software contained in the FMS computer.

In this overall system, the elements required to implement the present invention are the FMS computer (since the dialogue to be envisaged is dialogue between the pilot and the computer), and the MCDU console.

The MDCU data display and input console comprises a keyboard, a screen, function keys and means for selecting zones displayed on the screen and activating the selected zone so as to trigger operations which relate to what is displayed. These selection and activation means are the analogue of the well-known "mouse" used in the field of microcomputers, that is to say they are means which make it possible (1) to move a cursor (visible or invisible) around a menu displayed on the screen in order to select a zone proposed by this menu, which zone becomes highlighted for example when the cursor passes over this zone;

and (2) to activate a selected zone (the "click" button of the mouse).

In aeronautics a mouse is not normally used but rather shift keys, or else there is provision for the screen to be a touch screen, the designating of a zone by the finger bringing about the selection of this zone; alternatively, it is possible to use a touch tablet next to the screen. All these means for selecting zones on the screen are equivalent.

The function keys of the console can be laid out all round the screen, but it will be noted that they could even be displayed on the screen itself, for example around the periphery of a central region of the screen; in this case, the function keys are activated exactly in accordance with the principle indicated above by the zone selection means; the keys displayed on the screen are particular selectable zones which it is possible to "click" on. This is the particular case which is represented in the figures which show peripheral function keys around a central region which is termed the "message display region". The fact that the function keys are displayed on the screen makes it possible to reconfigure them more easily in order to modify the functions associated with these keys as required.

The navigation aid functions afforded by the present invention will now be described. These functions are carried out by using the FMS computer programmed specifically for executing the various display operations required.

To aid the understanding of the invention, a realistic navigation scenario will be described, during which the pilot (or the two pilots, namely the on-duty pilot PF and the off-duty pilot PNF respectively) uses the navigation aid means proposed by the invention.

The concrete example is an incident-free flight from Paris-Charles de Gaulle airport (CDG) to Frankfurt airport (FAR).

In this example, the scenario contains 7 major phases:
preflight
taxiing towards the take-off strips
take-off
climb
cruising
descent
approach At any instant, the flight management system is aware of which phase it is in because the operations performed by the pilot are monitored constantly by this system and because the behaviour of the aircraft is detected continuously by the sensors connected to the system.

1. Preflight

This is the phase during which the pilot defines his flight plan and initializes all the parameters of the aircraft (weight in particular).

Among the function keys of the MCDU console there is a specific key used in the present invention, namely the DO_LIST key. As has been stated, this key may either be a hardware key or a software key displayed on the screen and selectable by the zone selection means.

Figure 2:
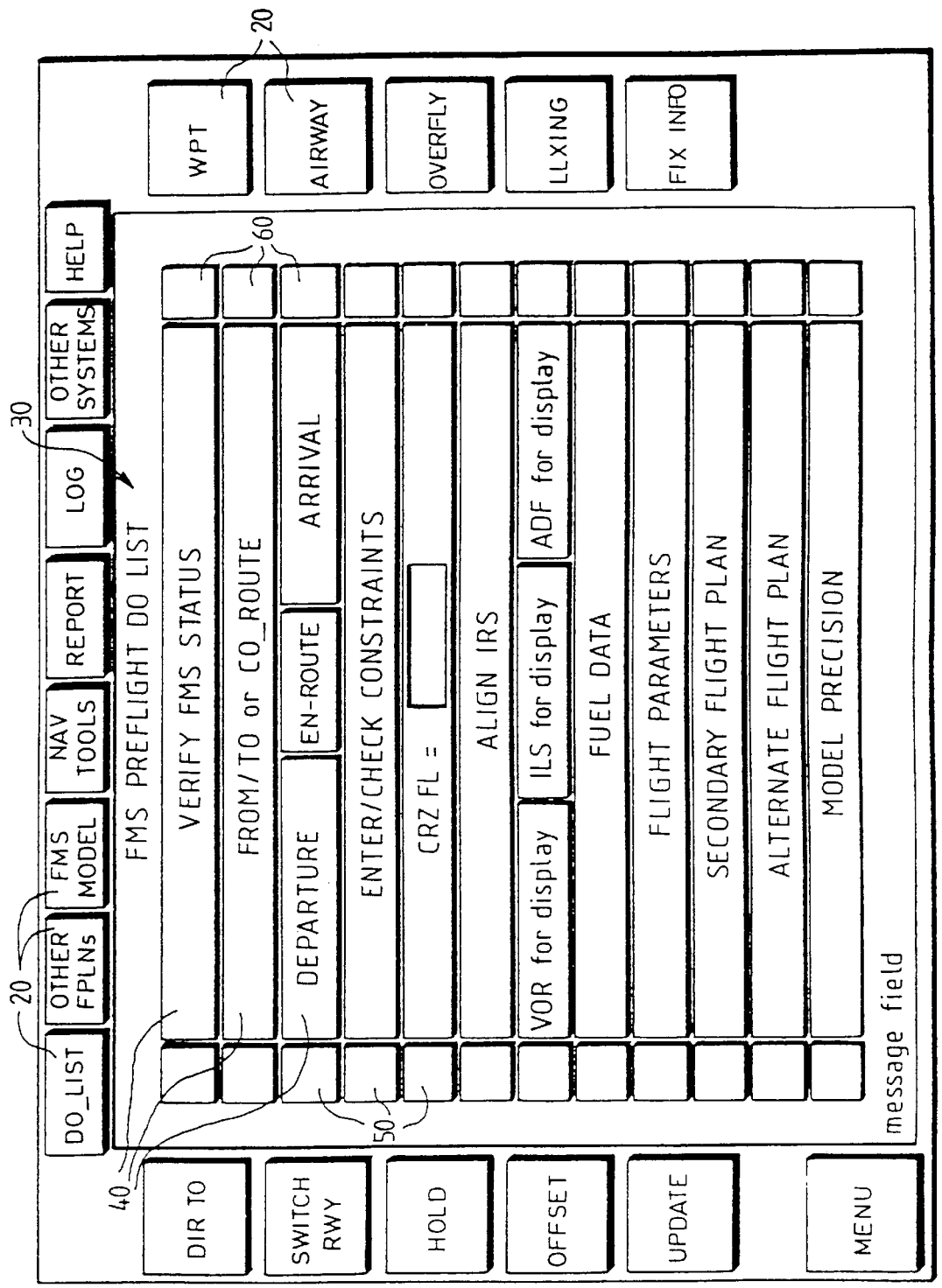
FIG. 2 represents the screen of the console at the start of a navigation procedure.

When the DO_LIST key is activated, an image such as that which may be seen in FIG. 2 is displayed by the FMS computer in the message display region; in this image, the function keys 20 such as the DO_LIST key still remain displayed, around the central message display region.

The image displayed in the central region of the screen comprises principally:
an information header 30,
selectable and activatable main zones 40,
auxiliary zones 50 and 60; the auxiliary zones are preferably selectable and activatable, but this is not obligatory. The main zones each contain information relating to procedural steps to be executed by the pilot in the preflight phase; when they are selected by the user they may be highlighted (or change colour, etc.) so that this selection is visible.

Generally, when a specified main zone is activated after having been selected, it triggers the displaying by the computer of messages and requests for data required in executing the procedural step corresponding to this zone. The main zones follow one beneath the other and/or one next to the other in an order which corresponds to the order of the procedure to be executed by the pilot.

When the aircraft is on the ground and in the preflight phase, the FMS computer is aware that it is in this phase, and this is why the depressing of the DO_LIST key has displayed the messages visible in FIG. 2. If the computer had detected that the aircraft was in some other phase, the depressing of the DO_LIST key would have brought up some other series of main zones, with other procedural indications, the activation of these different zones then triggering operations other than those which correspond to FIG. 2.

The list of procedural steps which is displayed in FIG. 2 and corresponds to the preflight phase comprises:
a header which provides a reminder that the menu displayed is a list of steps of the preflight procedure to be performed by the pilot
a written indication regarding the content of each step, in the various main zones which follow one another from top to bottom and from right to left.

Those expert in this matter will readily recognise the significance of the indications carried on the screen, these indications always being in English in aeronautics. The indications given are realistic indications but are merely examples, it being understood that other indications could be given in respect of the same operations and that other procedural operations could be elected in respect of a specified phase of flight.

The following procedural steps are listed in FIG. 2:
verification of the status of the flight management system,
indication of the route
data regarding departure (airport runway, etc.), en-route, arrival,
cruising altitude
alignment of the inertial systems with the longitude and latitude of the airport,
enforced display of radionavigation means chosen by the pilots,
fuel data: weight and centre of gravity
flight parameters
secondary flight plan
alternatve flight plan
display of a model of precision.

Certain steps may be obligatory within the procedure and others optional, for example here the last three are optional. The optional steps can be displayed in a slightly different form from the others (grey background for the former and black background for the latter for example).

If the user selects and activates a specified main zone, the computer displays a new screen, consisting mainly of information and requests for information.

Figure 3:
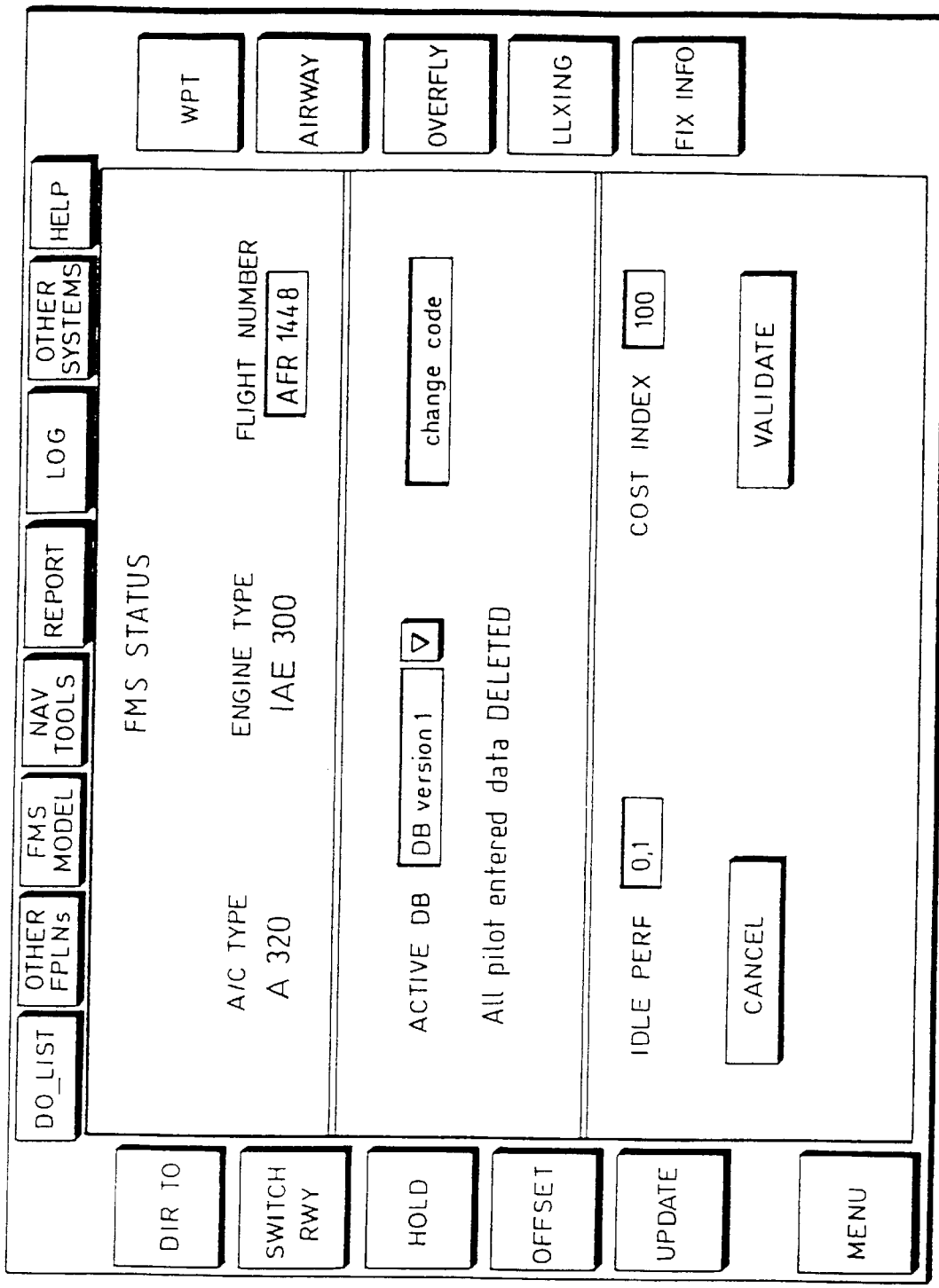
FIGS. 3 to 6 represent the screen at different steps of the procedure.

Thus, when the pilot selects and activates the first main zone, in which the indication for the "Verify FMS status" procedural step is displayed, the screen shows the display represented in FIG. 3, comprising a header ("FMS Status") providing a reminder that this is the verification step, messages (mainly information and requests for information), zones reserved for entering the information requested, a "Validate" button, and preferably also a "Cancel" button should the pilot wish to return to the menu without executing the current procedural step or delete the latest data input.

In this example, the FMS computer displays the type of aircraft and engine on the screen and requests information such as the scheduled flight number. This number, here "AFR1448", is entered at the keyboard by the pilot after he has selected the zone corresponding to this entry (or after the computer positions itself automatically on this zone). The pilot similarly enters the other data requested by this screen page.

When the messages corresponding to this procedural step have thus been received by the user and when the data requested have been keyed in, the user validates the operation (selection and activation of the "validate" zone), signifying that from his point of view the procedural step has been executed.

Validation may be performed by depressing a validate button, or selecting and clicking on an "OK" zone, or any other conventional validation solution: for example, the complete entry of the data requested by the computer in the relevant screen page may be interpreted by the computer as an action of validation for this page. The operations to be performed by the user in respect of a specified procedural step may involve the successive scrolling of several screen pages, the final validation of the execution of the procedural step then being performed on the last page displayed on the console by the FMS computer.

When validation has been performed for a specified main zone, the computer once again displays the screen page visible in FIG. 2, but together with a specific mark in an auxiliary zone associated with the relevant main zone; this auxiliary zone is preferably immediately adjacent to the main zone.

Thus, in the execution of the "Verify FMS Status" step, the depressing of the validation zone triggers two operations:

redisplaying of the menu screen of FIG. 2, and registering of a tick mark in the auxiliary zone 50 lying immediately to the left of the "Verify FMS Status" main zone.

This mark indicates that the corresponding procedural step has been performed and validated by the pilot who has performed the step.

Figure 4:
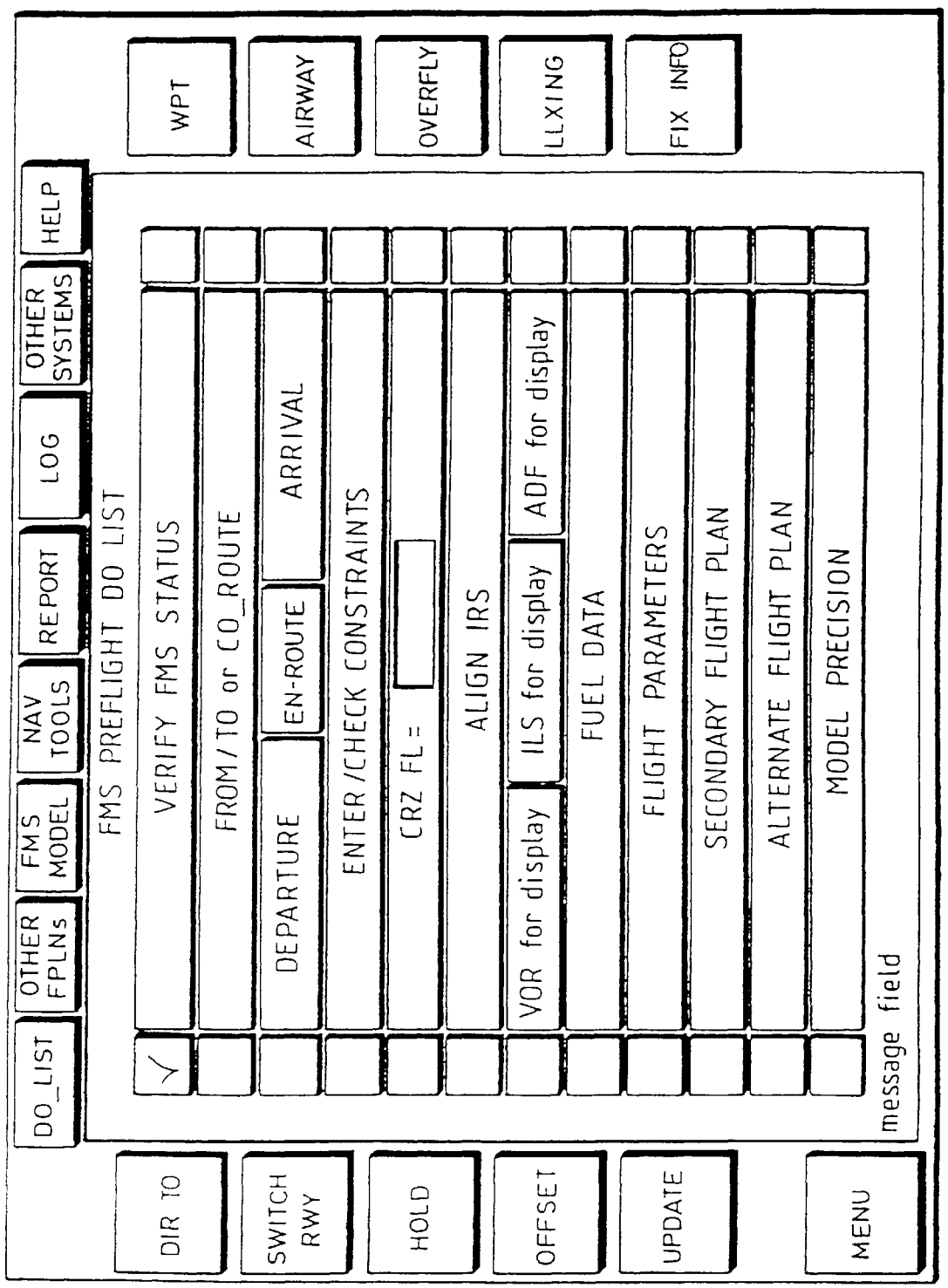

FIG. 4 represents the screen at this stage.

The pilot will thus perform the successive procedural steps proposed by the "FMS Preflight DO_LIST" screen, and a tick mark will appear opposite each validated step. The marks accumulate, that is to say at each validated procedural step a new mark will appear, but the marks of the previously validated steps will reappear each time.

The list visible on this screen therefore comprises the procedural steps already performed (ticked) together with the procedural steps which remain to be performed (unticked), thus very graphically affording the pilot a precise awareness of the situation at a given moment as against his obligations.

Figure 5:
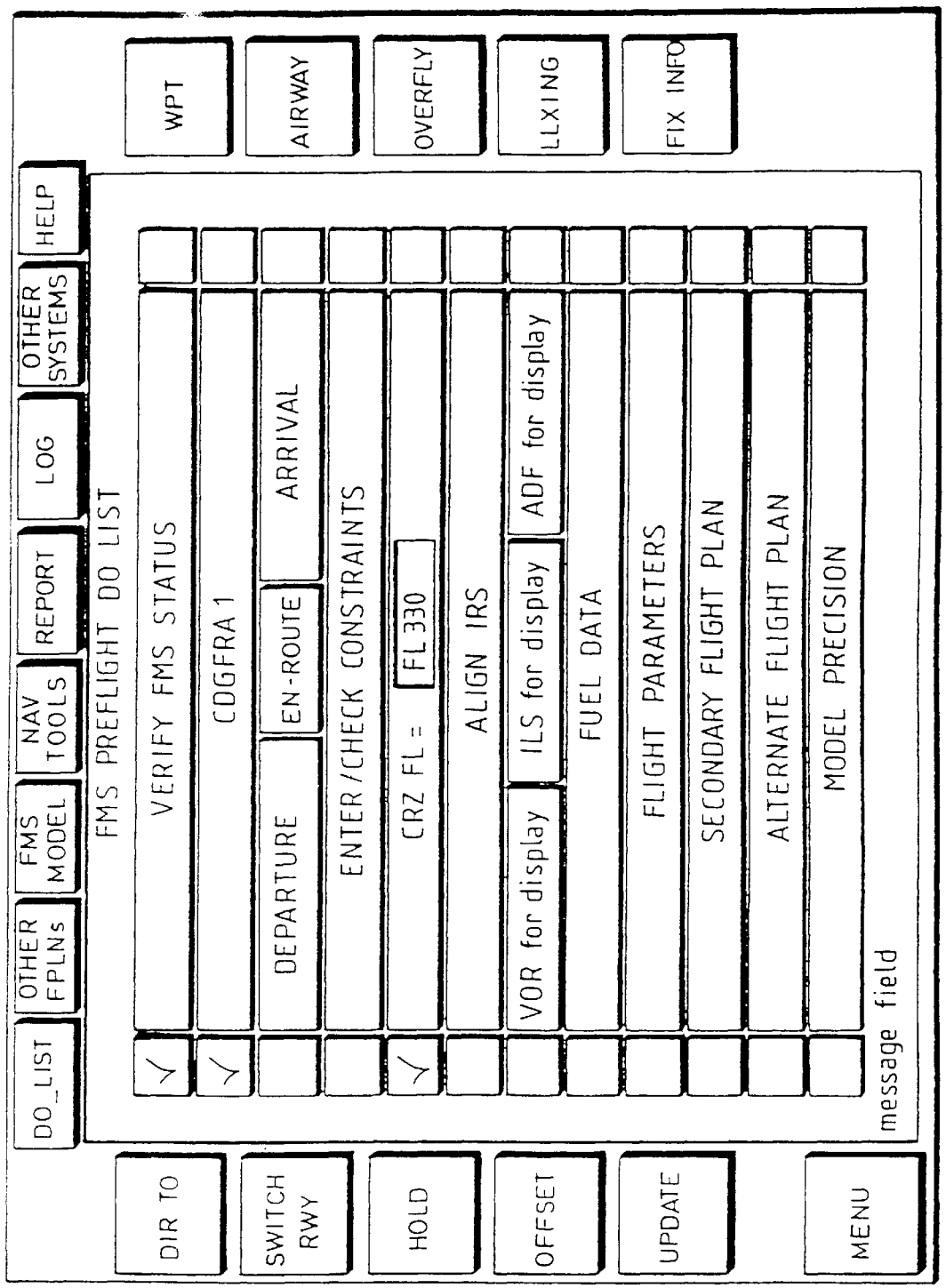

It will be noted that the indications carried in the main zones can be modified after validating the relevant step: FIG. 5 shows that the second step "FROM/TO or CO-ROUTE" (see FIG. 2) has also been executed since it is ticked, but the "CDGFRA1" indication has appeared in the corresponding zone to indicate to the pilot that the route keyed in is the Charles de Gaulle/Frankfurt route.

Likewise, an altitude of 33000 feet (10000 meters) is now indicated in the form "FL330" in the CRZFL main zone which corresponds to the step of choosing the cruising altitude. The corresponding auxiliary zone, to the left of the main zone, is ticked.

And so on and so forth, the procedure can be executed in full, including the optional steps, and at any moment the pilot knows where he is in the procedure, even if he is interrupted during execution, which frequently happens in reality.

In these figures, the main zones have been shown following one another mainly from top to bottom, in the order of the procedure, but provision may also be made for several main zones to appear on the same line, and provision may be made to associate an auxiliary zone either with each of the main zones or with a group of zones, as is the case for the three zones "Departure", "en-route" and "Arrival" for example.

2. Other Phases of Flight

Detailed explanations have been given with regard to the procedural steps of the preflight phase. The same principle is used for the other phases of flight if there is a list of procedural steps, or a list of checks to be performed. In practice, it is the descent phase prior to the approach phase which requires a new series of verifications and data inputs.

The pilot again depresses the DO_LIST key, and the FMS computer, aware of which phase of flight it is in, then displays on the screen the list of operations to be performed, which differs from that of FIG. 2, but is presented in the same way as main zones and auxiliary zones each associated with a respective main zone.

In one embodiment of the invention, provision may be made for the auxiliary zones to be, like the main zones, selectable and activatable by the selection means of the console. This then makes it possible either to select a ticked auxiliary zone, activation causing the removal of the tick mark, for example in the case where the pilot wishes subsequently to repeat the relevant procedural step, or even, in more exceptional cases, to tick a step without going through the procedure; this could be provided for example in respect of optional or less important procedural steps, or else particular steps which may be executed without relationship to the computer, or which do not require the FMS computer to display a data request screen.

According to another very advantageous possibility of the invention, an enhancement to the system according to the invention may be provided in cases where the aircraft is manoeuvred by a crew of two pilots, one of whom is called the on-duty pilot PF or pilot flying and the other the off-duty pilot PNF or pilot non-flying.

The pilots each occupy a seat equipped with dialogue interfaces, and these interfaces are identical for the two pilots and are linked in a similar manner to the FMS computer. The two MCDU consoles are controlled independently by the pilots, the computer being able to distinguish between the two consoles both for display and for data input.

It is thus proposed according to the invention that with each main zone of the screen called up by the DO_LIST key there be associated two different auxiliary zones, preferably one to the left and one to the right of the main zone.

This is represented in the figures. On each of the screens, the computer will tick the left-hand auxiliary zone if it is the left-hand pilot who has performed and validated the procedural step, or the right-hand auxiliary zone if it is the right-hand pilot who has done the same.

Thus, the procedural steps performed appear on the two consoles and each of the pilots can determine who has performed the operation. It is indeed common for one of the pilots to ask the other to perform certain operations; thus, at any instant he can be certain of what has been done without needing to memorize both his own actions and those of his colleague.

Figure 6:
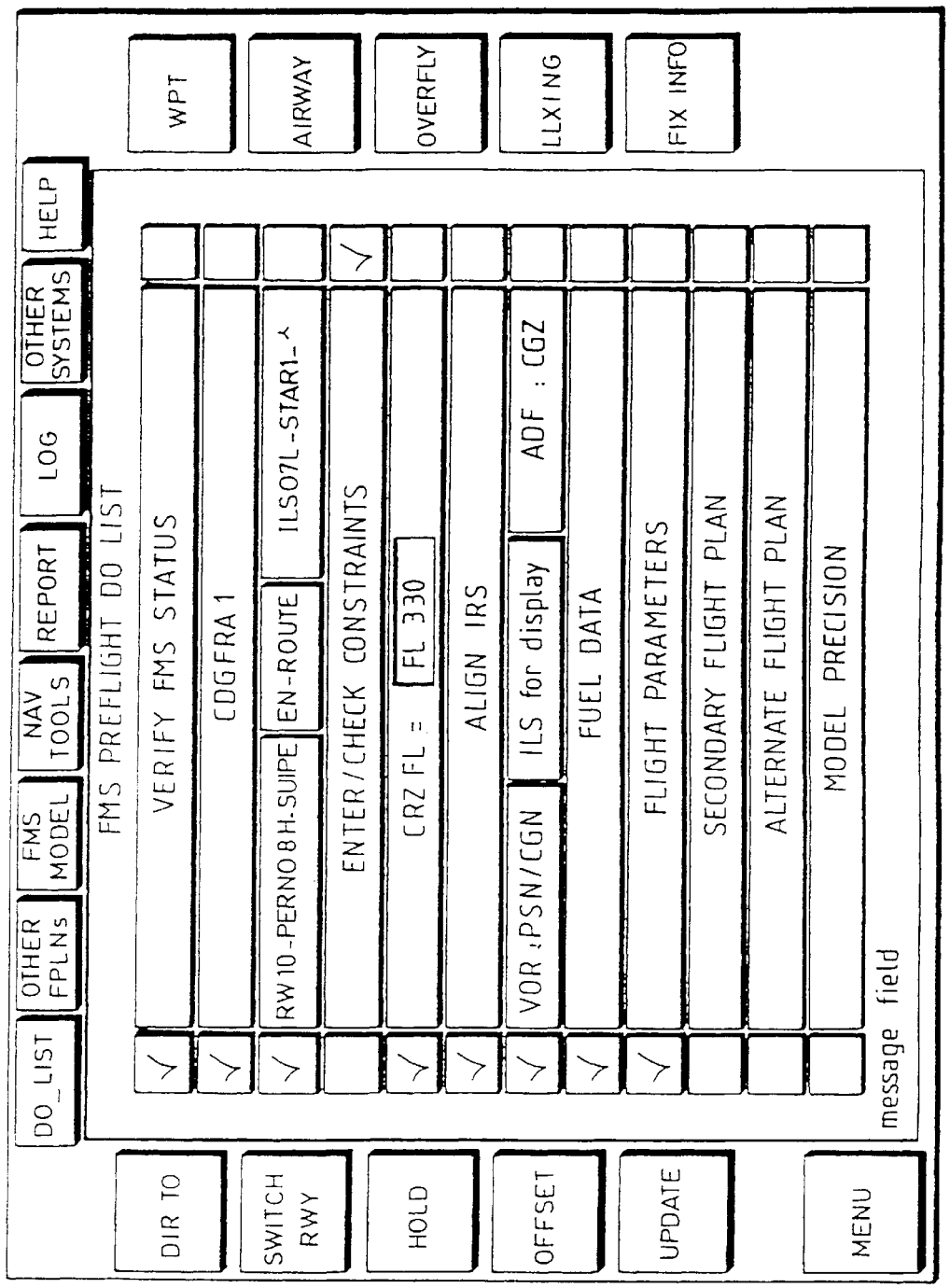

FIG. 6 represents a corresponding example in which one of the operations has been performed by the right-hand pilot. The two consoles display the same image.

Figure 7:
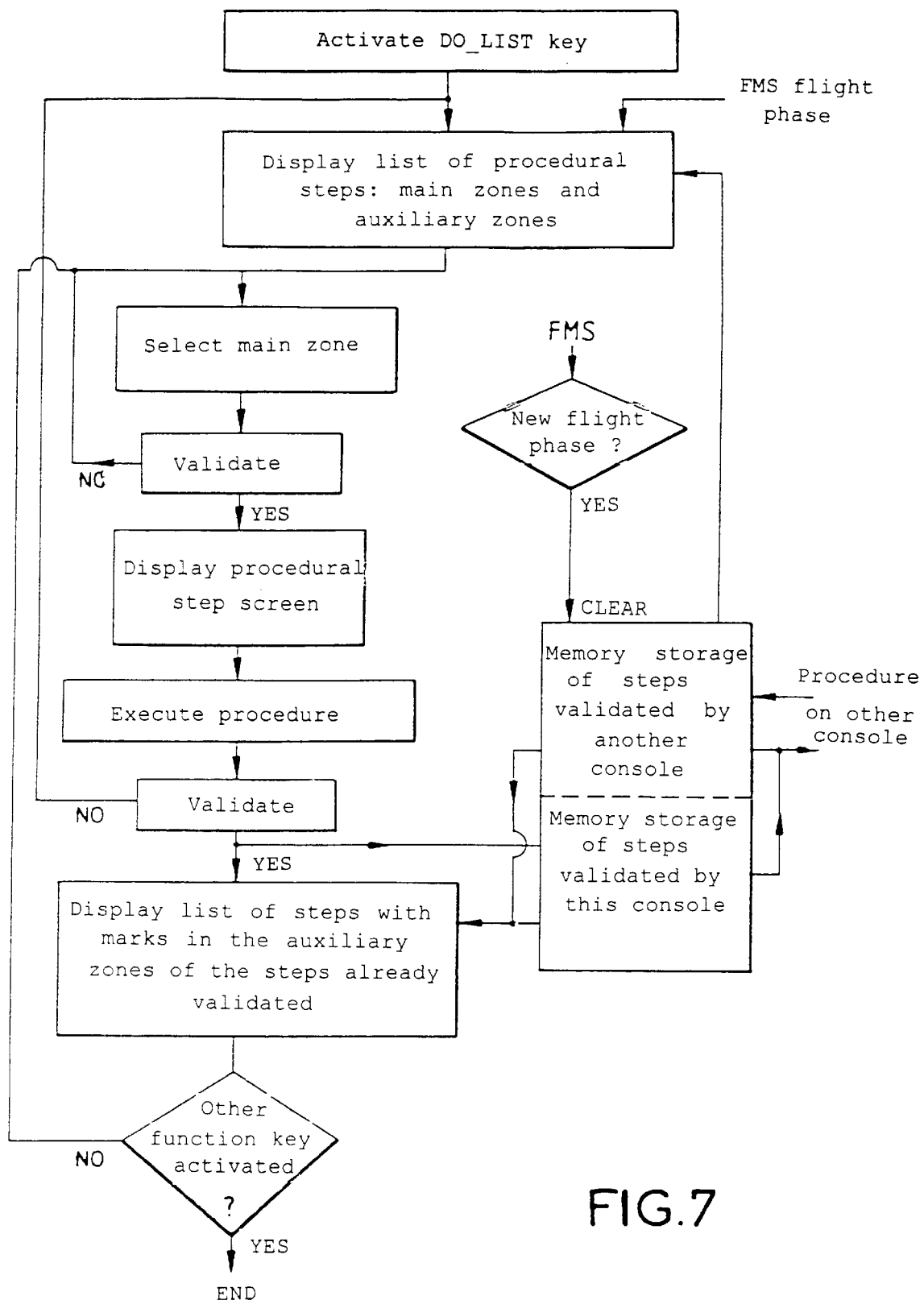
FIG. 7 represents a flow chart of the operation of the flight management system in respect of functions relating to the invention.

Of course, the invention is carried out by suitably programming the FMS computer, and the overall flow chart for the operation of the software part corresponding to the invention is recalled in FIG. 7. In this flow chart are shown:

the displaying of the menu of procedural steps when the "DO_LIST" function key is activated, the display depending on the current flight phase; the auxiliary zones are ticked only for procedural steps which have already been performed, especially by the other pilot on the other console;

the selecting and validating of a main zone, with the displaying of a new corresponding screen;

the validating after execution of a procedural step, and the placing of this validation information into memory, with a view to subsequent displaying on the two consoles if there are two;

the new displaying of a menu of steps with the ticking of a new auxiliary zone and of the auxiliary zones corresponding to the steps already validated;

the clearing of the tick memory if there is a change of flight phase, given that the menu of procedures displayed by activating the DO_LIST key depends on the flight phase; and the displaying in the new menu of the information input during the previous phases and which is still valid in the new phase;

the possibility of continuing the procedure by selecting a new procedural step, or the end of the procedure if some other function key is activated.

In practice, the two essential phases for which the DO_LIST menu will be used will be the preflight phase and the approach phase. The menu displayed at the start of the approach phase procedure will include auxiliary zones 50 which are not ticked (erasure of the tick memory) but will additionally include indications which have been input during the preflight phase (that is to say the tick memory has been cleared, but other information which still has validity is not cleared).

What is claimed is:

1. A method for aiding aerial navigation, using a flight management system coupled to a first console, said method comprising the steps of:

displaying on the first console a first screen including plural main zones corresponding to flight procedures, the plural main zones including a first main zone, and a first set of auxiliary zones including a first auxiliary zone, each of the auxiliary zones in the first set being associated with and positioned immediately next to one of the plural main zones, the first auxiliary zone of the first set being associated with and positioned immediately next to the first main zone;

displaying a second screen on the first console, when a first user selects the first main zone, the second screen including procedural elements for executing the flight procedure associated with the first main zone; and redisplaying the first screen on the first console in response to receiving a validation command from a first user while displaying the second screen, and automatically displaying a first mark in the first auxiliary zone of the first set to indicate validation by the first user of the flight procedure associated with the first main zone.

2. A method according to claim 1, further comprising the steps of:

displaying a third screen on the first console in response to the first user selecting a second main zone of said plural main zones, the third screen including procedural elements for executing the flight procedure associated with the second main zone; and redisplaying the first screen on the first console in response to receiving another validation command from the first user while displaying the third screen, and automatically displaying a second mark in a second auxiliary zone of the first set of auxiliary zones to indicate validation of the flight procedure associated with the second main zone, the second auxiliary zone of the first set being associated with and positioned immediately next to the second main zone, the first and second marks being simultaneously displayed to comprehensively indicate which of the flight procedures have been validated.

3. A method according to claim 1, wherein the flight management system is coupled to a second console and the first screen includes a second set of auxiliary zones including a first auxiliary zone, each of the auxiliary zones in the second set being associated with one of the plural main zones, the first auxiliary zone of the second set being associated with the first main zone, the method further comprising the steps of:

displaying the first screen on the second console;

displaying the second screen on the second console when a second user selects the first main zone displayed on the second console; and redisplaying the first screen on the second console in response to receiving a validation command from the second user while displaying the second screen on the second console, and automatically displaying on the first and second consoles a second mark in the first auxiliary zone of the second set of auxiliary zones to indicate validation by the second user of the flight procedure associated with the first main zone, while displaying the first mark on the first and second consoles.

4. A system for aiding aerial navigation, the apparatus comprising:

a flight management system; and a first console coupled to the flight management system, the first console being configured to display a first screen including plural main zones corresponding to flight procedures, the plural main zones including a first main zone and a first set of auxiliary zones including a first auxiliary zone, each of the auxiliary zones in the first set being associated with and positioned immediately next to one of the plural main zones, the first auxiliary zone being associated with and positioned immediately next to the first main zone; configured to display a second screen when a first user selects the first main zone, the second screen including procedural elements for executing the flight procedure associated with the first main zone; and configured to redisplay the first screen in response to receiving a validation command from a first user while displaying the second screen, and automatically displaying a first mark in the first auxiliary zone of the first set to indicate validation of the flight procedure associated with the first main zone by the first user.

5. A system according to claim 4, wherein the first console is further configured to display a third screen in response to the first user selecting a second main zone of said plural main zones, the third screen including procedural elements for executing the flight procedure associated with the second main zone; and configured to redisplay the first screen in response to receiving a validation command from the first user while displaying the third screen, and to automatically display a second mark in a second auxiliary zone of the first set of auxiliary zones to indicate validation of the flight procedure associated with the second main zone, the second auxiliary zone of the first set being associated with and positioned immediately next to the second main zone, the first and second marks being simultaneously displayed to comprehensively indicate which of the flight procedures have been validated.

6. A system according to claim 4, wherein the first screen includes a second set of auxiliary zones including a first auxiliary zone, each of the auxiliary zones in the second set being associated with one of the plural main zones, the first auxiliary zone of the second set being associated with the first main zone, the system further comprising:

a second console coupled to the flight management system, the second console being configured to display the first screen on the second console, configured to display the second screen on the second console when a second user selects the first main zone displayed on the second console, and configured to redisplay the first screen on the second console in response to receiving a validation command from the second user while displaying the second screen on the second console, and to automatically display on the first and second consoles a second mark in the first auxiliary zone of the second set of auxiliary zones to indicate validation by the second user of the flight procedure associated with the first main zone, while displaying the first mark on the first and second consoles.

7. A system for aiding aerial navigation, comprising:

means for managing a flight; and first interface means for interfacing with a first user, coupled to the means for managing a flight, the first interface means comprising means for displaying a first screen, the first screen including plural main zones corresponding to flight procedures, the plural main zones including a first main zone, and a first set of auxiliary zones including a first auxiliary zone, each of the auxiliary zones in the first set being associated with and positioned immediately next to one of the plural main zones, the first auxiliary zone of the first set being associated with and positioned immediately next to the first main zone, means for displaying a second screen on the first interface means when the first user selects the first main zone, the second screen including procedural elements for executing the flight procedure associated with the first main zone, and means for redisplaying the first screen on the first interface means in response to receiving a validation command from the first user while displaying the second screen, and for automatically displaying a first mark in the first auxiliary zone of the first set to indicate validation by the first user of the flight procedure associated with the first main zone.

8. A system according to claim 7, wherein the first interface means further comprises:

means for displaying a third screen on the first interface means, in response to the first user selecting a second main zone of said plural main zones, the third screen including procedural elements for executing the flight procedure associated with the second main zone; and means for redisplaying the first screen on the first interface means in response to receiving a validation command from the first user while displaying the third screen, and automatically displaying a second mark in a second auxiliary zone of the first set of auxiliary zones to indicate validation of the flight procedure associated with the second main zone, the second auxiliary zone of the first set being associated with and positioned immediately next to the second main zone, the first and second marks being simultaneously displayed to comprehensively indicate which of the flight procedures have been validated.

9. A system according to claim 7, wherein the first screen includes a second set of auxiliary zones including a first auxiliary zone, each of the auxiliary zones in the second set being associated with one of the plural main zones, the first auxiliary zone of the second set being associated with the first main zone, the system further comprising:

second interface means for interfacing with a second user, coupled to the means for managing the flight, the second interface means including means for displaying the first screen on the second interface means, means for displaying the second screen on the second interface means when the second user selects the first main zone displayed on the second interface means, and means for redisplaying the first screen on the second interface means in response to receiving a validation command from the second user while displaying the second screen on the second interface means, and for automatically displaying on the first and second interface means a second mark in the first auxiliary zone of the second set of auxiliary zones to indicate validation of the flight procedure associated with the first main zone by the second user while displaying the first mark on the first and second interface means.

* * * * *